United States Patent

Guglielmetti et al.

[15] 3,696,193
[45] Oct. 3, 1972

[54] COSMETIC PREPARATION CONTAINING 2-PHENYL-BENZOXAZOLES

[72] Inventors: Leonardo Guglielmetti, Birsfelden; Max Duennenberger, Frenkendorf, both of Switzerland

[73] Assignee: Ciba-Geigy AG, Basel, Switzerland

[22] Filed: June 2, 1971

[21] Appl. No.: 149,359

Related U.S. Application Data

[63] Continuation-in-part of Ser. No. 630,183, April 12, 1967, abandoned.

[30] Foreign Application Priority Data

April 21, 1966   Switzerland..............5811/66

[52] U.S. Cl. ...............424/59, 260/307.4, 424/47, 424/272, 424/285, 424/308, 424/324
[51] Int. Cl. ...............................................A61l 23/00
[58] Field of Search ............424/59, 272; 260/307.4

[56] References Cited

UNITED STATES PATENTS

| | | |
|---|---|---|
| 2,334,348 | 11/1943 | Miglarese ............260/307.4 X |
| 2,104,492 | 1/1938 | Merkel et al. ................424/59 |
| 3,095,422 | 6/1963 | Duennenberger et al........................424/272 X |

FOREIGN PATENTS OR APPLICATIONS 936,120   9/1963   Great Britain..........260/307.4

*Primary Examiner*—Albert T. Meyers
*Assistant Examiner*—Dale R. Ore
*Attorney*—Harry Goldsmith, Joseph G. Kolodny and Mario A. Monaco

[57] ABSTRACT

The invention relates to ultraviolet absorbers with a specific absorption range which makes them suitable for cosmetic uses. These ultraviolet absorbers correspond to the formula

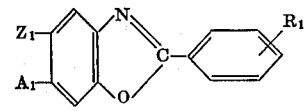

where $R_1$ represents a hydrogen atom or an alkyl radical, one of the symbols $A_1$ or $Z_1$ is a sulphonic acid function and $Z_1$, when $A_1$ stands for one of the above-mentioned sulphonic acid functions, represents a hydrogen atom or an alkyl group, or conversely $A_1$ represents a hydrogen atom when $Z_1$ stands for one of these sulphonic acid functions.

7 Claims, No Drawings

COSMETIC PREPARATION CONTAINING 2-PHENYL-BENZOXAZOLES

This is a continuation-in-part of our copending patent application Ser. No. 630,183, filed Apr. 12, 1967, now abandoned.

The present invention provides specific derivatives of 2-phenylbenzoxazole and is especially concerned with their use as ultraviolet absorbers for cosmetic purposes.

Various ultraviolet absorbers for cosmetic preparations have already been proposed, including compounds based on 2-phenylbenzoxazole, but none of them is completely satisfactory in actual practice insofar as the absorption range or the physiological acceptability is concerned.

It has now been found that these disadvantages can unexpectedly be overcome by using as ultraviolet absorbers for cosmetic purposes 2-phenylbenzoxazole derivatives corresponding to the formula (1) 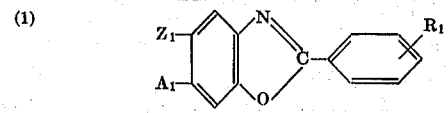

where $R_1$ represents a hydrogen atom or an alkyl radical containing one to six carbon atoms, one of the symbols $A_1$ or $Z_1$ is a sulphonic acid function of the series $-SO_3H$ or $-SO_3^-Me^+$ or $-SO_2NHX_1$ (where $Me^+$ is an alkali metal ion, ammonium ion or amine salt ion) and $X_1$ represents a hydrogen atom, an alkyl group containing one to 12 carbon atoms or a hydroxyalkyl group containing to four carbon atoms, and $Z_1$, when $A_1$ stands for one of the above-mentioned sulphonic acid functions, represents a hydrogen atom or an alkyl group containing one to four carbon atoms, or conversely $A_1$ represents a hydrogen atom when $Z_1$ stands for one of these sulphonic acid functions.

Among the compounds of the above Formula (1) those are of special value whose total molecule contains at least one alkyl group with one to four carbon atoms.

Of special value within the scope of the present invention are the new 2-phenylbenzoxazole derivatives of the formula (2) 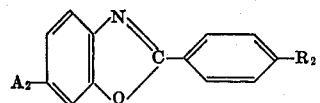

in which $R_2$ represents a methyl group or a tertiary butyl group and $A_2$ a group $-SO_3^-Me^+$ (where $Me^+$ is an alkali metal ion or ammonium ion) or a group $-SO_2NHX_2$ (where $X_2$ stands for an alkyl group containing one to eight carbon atoms).

As examples of 2-phenyl-benzoxazole derivatives suitable for use according to this invention there may be mentioned the compounds shown in the following table, in which column I = formula number, column II = formula, column III = melting point in °C, uncorrected and column IV = reference to the manufacturing process as described in greater detail below.

| I | II | III | IV |
|---|---|---|---|
| 3 | (CH₃)₂HN.HO₃S—[benzoxazole]—C(CH₃)₃ | 259–261 | A |
| 4 | (CH₃)₂HN.HO₃S—[benzoxazole]—CH₃ | 229–230 | A |
| 5 | (CH₃)₂HN.HO₃S—[benzoxazole]—CH₃ (meta) | 179–180 | A |
| 6 | (CH₃)₂HN.HO₃S—[benzoxazole]—CH₃ (ortho) | 178–179 | A |
| 7 | H₃C—[benzoxazole]—(CH₃)₂HN.HO₃S— | 150–152 | A |
| 8 | NaO₃S—[benzoxazole]—C(CH₃)₃ · ½H₂O | >320 | B |
| 9 | NaO₃S—[benzoxazole]—CH₃ | >360 | B, C |

| I | II | III | IV |
|---|---|---|---|
| 10 | (structure: $C_2H_5-NH-O_2S$ substituted benzoxazole with $-C_6H_4-CH_3$) | 162–163 | E |
| 11 | (structure: $CH_3-NH-O_2S$ substituted benzoxazole with $-C_6H_4-CH_3$) | 185.5–186 | E |
| 12 | (structure: $H_2N-O_2S$ substituted benzoxazole with $-C_6H_4-CH_3$) | 244–245 | E |
| 13 | (structure: $HO-CH_2CH_2-NH-O_2S$ substituted benzoxazole with $-C_6H_4-CH_3$) | 161–162 | E |
| 14 | (structure: $CH_3-(CH_2)_7-NH-O_2S$ substituted benzoxazole with $-C_6H_4-CH_3$) | 95–96 | E |
| 15 | (structure: $(CH_3)_3C$ and $ClO_2S$ substituted benzoxazole with phenyl) | 213–215 | A |

A considerable number of the afore-mentioned compounds are new, above all: Compounds of the formula

(16) 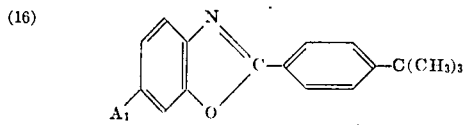

where $A_1$ is the sulphonic acid function $-SO_3H$ or $-SO_3^-Me^+$ or $-SO_2NHX_1$ ($Me^+$ being an alkali metal ion, ammonium ion or amine salt ion), and $X_1$ represents a hydrogen atom, an alkyl group with one to 12 carbon atoms or a hydroxyalkyl group with one to four carbon atoms, as well as compounds of the formula

(17) 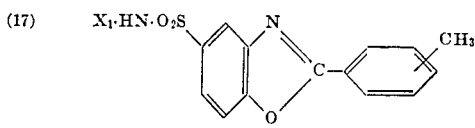

where $X_1$ represents a hydrogen atom, an alkyl group with one to 12 carbon atoms or a hydroxyalkyl group with one to four carbon atoms.

The 2-phenylbenzoxazoles defined above can be manufactured in a manner similar to known processes, for example by reacting equimolecular proportions of an orthoehydroxy-aminobenzene of the formula

(18) 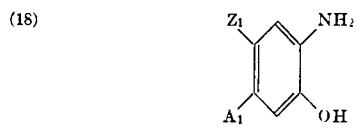

and of a benzene-monocarboxylic acid chloride of the formula (19)

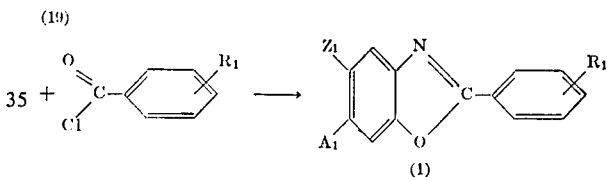

(1)

In these formulas all symbols have the meanings defined above and $Z_1$ represents the sulphonic acid function.

Depending on the physical and chemical nature of the components the reaction may be performed in substance (for example in the melt) or in solution; in the latter case it is, of course, possible to use any solvent that has, on one hand, sufficient solvent power and, on the other hand, is chemically inert towards the reactants (example: dichlorobenzenes). The temperature range to be used for the reaction should be substantially adapted to the reactivity of the reactants; in actual manufacture the interval from 150° to 250°C will in general be used. It is advantageous to perform the reaction in the presence of a catalyst or assistant having a dehydrating action or favoring dehydration, for example, boric acid, paratoluenesulphonic acid, a phosphoric acid, sulphuric acid or the like. Advantageously, the amide primarily formed by heating the reactants (intermediate product) is converted into the corresponding benzoxazole compound by heating with a phosphorus halide.

According to another variant of the process for the manufacture of the compounds to be used according to this invention the starting material used is a 2-phenylbenzoxazole of the formula

(20) 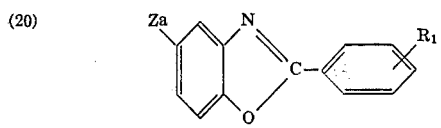

where $Z_a$ represents a hydrogen atom or an alkyl group with one to four carbon atoms
and this compound is treated with
a. sulphuric acid monohydrate or
b. chlorosulphonic acid.

In the former case (a) there are obtained compounds of the formula

(21) 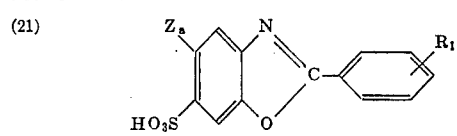

whereas variant (b) gives rise to the compounds of the type

(22) 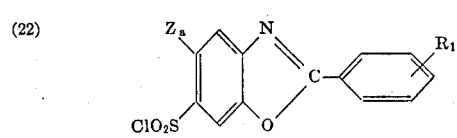

For the above-mentioned variants (a) and (b) it is advantageous to maintain the reaction temperature within the range from 50° to 150°C, preferably from 100° to 150°C. The sulphonating agent is advantageously used in an excess over the theoretically required proportion and serves at the same time as solvent.

The 2-phenylbenzoxazole derivatives to be used according to this invention may be used as agents protecting the skin from ultraviolet rays. They can be made up in known manner into stable cosmetic preparations ready for immediate use. Advantageously, they are mixed or emulsified with, or preferably dissolved in, vehicle substances; such vehicles may be liquid or semisolid and include liquid organic diluents, for example organic solvents such as alcohols or ketones, for example ethanol, isopropanol, glycerin, cyclohexanol, methylcyclohexanol; furthermore trichlorethylene, benzine, esters of vegetable or animal origin, such as vegetable or animal oils or fats, for example groundnut oil, cocoa butter or lanolin. Further suitable are mineral solvents such as liquid paraffin, white mineral oil, white petroleum jelly, or liquid petrolatum. If an aqueous dispersion of the ultraviolet absorber is desired, the latter can be directly finely dispersed in water with the aid of a suitable dispersant or it may be completely or partially dissolved in an organic vehicle (see above) and then dispersed or emulsified in water. It goes without saying that such mixtures and preparations may also contain further ingredients, for example skin care agents, insect repellants, deodorants, aromas or coloring matters. By a suitable choice of one or several vehicles and, if desired, further additives there are obtained solutions, ointments, pastes, creams, oils or emulsions.

With the use of suitable solvents, for example fluorochloralkanes, it is also possible to manufacture spray preparations (so-called aerosol sprays) which are kept in closed containers and on actuation of a valve are directly sprayed over the skin area to be protected.

The amount of new 2-phenylbenzoxazole to be incorporated with the cosmetic preparation may vary within rather wide limits depending on the type of the preparation. For most practical purposes, however, a quantity from 0.05 to 5, preferably from 1 to 3, percent by weight of 2-phenylbenzoxazole derivative, referred to the weight of the preparation as a whole, will be acceptable.

The 2-phenylbenzoxazole derivatives to be used as ultraviolet absorbers according to this invention are particularly suitable as agents for protecting the skin because they are readily soluble in solvents conventionally used for cosmetic purposes. The phenylbenzoxazoles to be used according to this invention are especially advantageous because they absorb very strongly within the region from 290 to 320 m$\mu$ and thus substantially absorb the ultraviolet rays up to about 330m$\mu$ which cause reddening of the skin, but they do not affect rays of a higher wavelength above 340m$\mu$, whose tanning effect is desired as a rule. This behavior is not observed with other compounds having a similar constitution.

Unless otherwise indicated, parts and percentages in the following Manufacturing Instructions and examples are by weight.

MANUFACTURING INSTRUCTIONS

A. twenty five grams of the compound of the formula

(23) 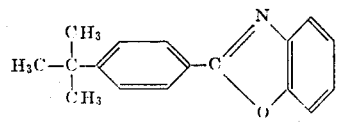

are dissolved at room temperature in 50 ml of chlorosulphonic acid, while being stirred heating to 100°C and maintained for 1 hour at 100°C. The reaction mixture is then cooled to room temperature and poured out over ice. The amorphous precipitate is suctioned off, taken up in ether and washed with a 2N-sodium carbonate solution and then with water until the washings run neutral. The ethereal solution is dehydrated with sodium sulphate and evaporated to dryness. Yield: 23.7 g of the compound of the formula

(24) 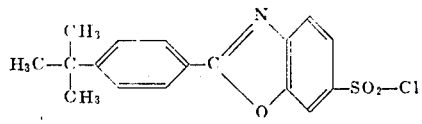

in the form of colorless crystals melting at 116° to 119°C; after recrystallization from hexane with the aid of active carbon it forms colourless needles melting at 125° to 126°C.

Analysis: $C_{17}H_{16}O_3NSCl$; (349.85)
 calculated: C 58.36; H 4.61; N 4.00; Cl 10.13; S 9.17%
 Found: 58.63; 4.68; 4.02 10.20; 9.01%.

The following compounds are obtained in a similar manner:

(a) (25) 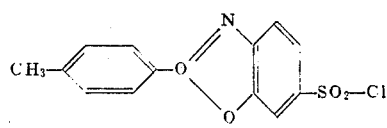

White needles from hexane, melting at 134° to 136°C.
Analysis: $C_{14}H_{10}O_3NSCl$; (307.76)

calculated: C 54.64; H 3.28; N 4.55; Cl 11.52; S 10.42%
found: 54.41; 3.16; 4.51; 11.61; 10.58%.

(b) (26) 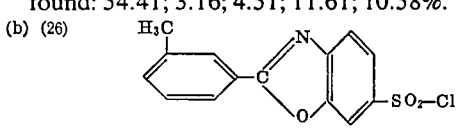

White needles from hexane, melting at 99° to 100°C.
Analysis: C₁₄H₁₀O₃NSCl; (307.76)
    Calculated: C 54.64; H 3.28; N 4.55%
    found: 54.66; 3.43; 4.56%.

(c) (27) 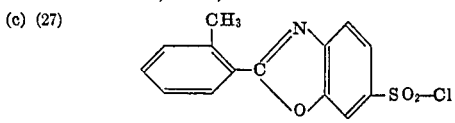

Needles from ligroin (boiling at 110° to 140°C) melting at 134° to 135°C.
Analysis: C₁₄H₁₀O₃NSCl; (307.76)
    calculated: C 54.64; H 3.28; N 4.55%
    found: 54.14; 3.23; 4.50%.

(d) (28) 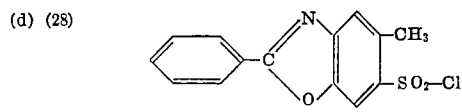

White needles from ligroin (boiling at 110° to 140°C) melting at 132° to 133°C.
Analysis: C₁₄H₁₀O₃NSCl; (307.76)
    calculated: C 54.64; H 3.28; N 4.55%
    found: 54.65; 3.20; 4.29%.

A solution of 132g of the compound of the formula (24) in 1 liter of hot dimethylformamide is refluxed for 3 hours. The reaction mixture is concentrated to about 150 ml and slowly mixed with 1 liter of alcohol, to yield 122 g of the compound of the formula (3) 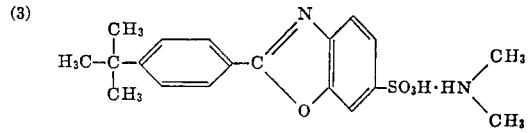

in colorless crystals melting at 259° to 261°C. After recrystallization from dimethylformamide+alcohol with the aid of active carbon it forms needles melting at 260° to 261°C
Analysis: C₁₉H₂₄O₄N₂S; (376.48)
    calculated: C 60.62; H 6.43; N 7.44; S 8.52%.
    found: 60.57; 6.31; 7.45; 8.59%.

An analogous reaction of the compound of the Formula (25) gives rise to the compound of the formula (4) 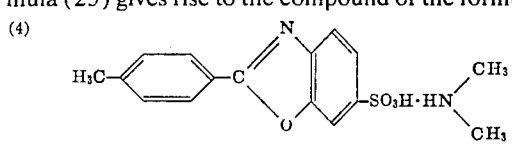

in the form of white needles from dimethylformamide+alcohol, melting at 229° to 230°C.
Analysis: C₁₆H₁₈O₄N₂S; (334.40)
    calculated; C 57.47; H 5.43; N 8.38%.
    found: 57.42; 5.37, 8.37%

An analogous reaction of the compound of the formula (26) gives rise to the compound of the formula (5) 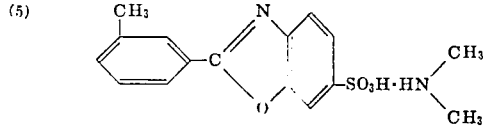

in small, white needles from ethanol+ether, melting at 179° to 180°C.
Analysis: C₁₆H₁₈O₄S; (334.40)
    calculated: C 57.47; H 5.43; N 8.38; S 9.59%.
    found: 57.56; 5.37; 8.15; 9.64%.

An analogous reaction of the compound of the formula (27) gives rise to the compound of the formula (6) 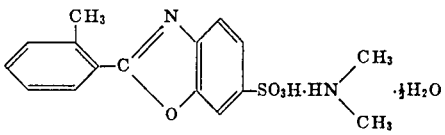

in small, white needles from ethanol+ether, melting at 178° to 179°C.
Analysis: C₁₆H₁₈O₄N₂S; (334.40) ½H₂O
    calculated: C 55.96; H 5.58; N 8.16; S 9.34%.
    found: 55.94; 5.55; 8.22; 9.77%.

An analogous reaction of the compound of the Formula (28) gives rise to the compound of the formula (7) 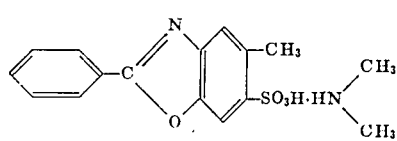

in small, white needles from ethanol+ether, melting at 150° to 152°C.
Analysis: C₁₆H₁₈O₄N₂S; (334.40)
    calculated: C 57.47; H 5.43; N 8.38; S 9.59%.
    found: 57.43; 5.69; 9.27; 9.16%.

B. Eight-six grams of the compound of the Formula (3) are dissolved with heating in 100 ml of a sodium hydroxide solution of 20 percent strength (during which dimethylamine is evolved), alcohol is slowly added and the whole cooled to −10°C, then suctioned and washed with alcohol and ether, to yield 74 g of the compound of the formula (8) 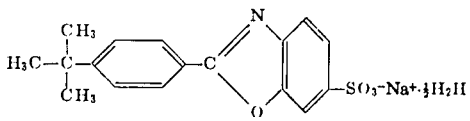

in colorless crystals melting above 320°C. After recrystallization from aqueous alcohol the melting point is still above 320°C. Analysis: C₁₇H₁₆O₄NSNa·½H₂O; (362.37)
    calculated: C 56.34; H 4.73; N 3.86; S 8.85%.
    found: 56.57; 4.73; 3.89; 8.87%.

In an analogous manner the compound of the Formula (4) furnishes the compound of the formula (9) 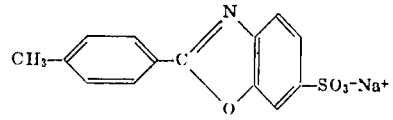

in small, white needles from aqueous alcohol, melting above 360°C.
Analysis: C₁₄H₁₀O₄NSNa; (311.29)
    calculated: C 54.02; H 3.24; N 4.50; S 10.30%.
    found: 54.34; 3.23; 4.62; 10.28%.

C. The compound of the Formula (9) may alternatively be prepared by direct sulphonation in the following manner:
One hundred-and-fifty grams of the compound of the formula

(29) 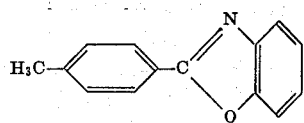

are dissolved with stirring in 500 ml of sulphuric acid monohydrate. The reaction mixture is stirred on for 5 hours at 150°C, then cooled to 0°C and poured out over ice. While cooling, a sodium hydroxide solution of 30 percent strength is stirred in until the product of the Formula (9) precipitates in the form of the sodium salt. Yield: 170g (=72 percent of the theoretical). After three recrystallizations from water with the aid of active carbon white needles are obtained which melt about 300°C.

Analysis: $C_{14}H_{10}NSO_4Na \cdot H_2O$; (329.29)
calculated: C 51.20; H. 3.68; N 4.27; S 9.80%
found: 50.84; 3.71; 4.20; 9.92%.

D. 154.6 grams of toluylchloride, 189.2 g of finely powdered 2-aminophenol-4-sulphonic acid and 2 ml of pyridine are suspended in 1 liter of ortho-dichlorobenzene. The reaction mixture is refluxed under nitrogen, during which hydrochloric gas is evolved. When hydrochloric gas is no longer being given off (after about 14 hours) the reaction mixture is cooled to 5°C and the precipitate is suctioned off. Yield: 266g of the compound of the formula

(30) 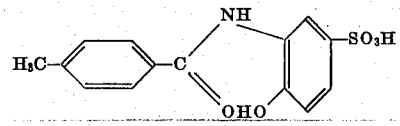

in the form of a white powder melting at 256° to 257°C with decomposition.

Sixty one grams of the compound of the Formula (30) are taken up in 200 ml of freshly distilled phosphorus oxychloride, mixed with 41.6 g phosphorus pentachloride and refluxed. When the evolution of hydrochloric gas has ceased (after about 17 hours), the hot reaction mixture is evaporated to dryness under vacuum, taken up in dioxane and slowly mixed with water until crystals settle out. Yield: 22 g of the compound of the formula

(31) 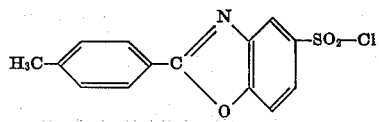

in the form of white crystals melting at 119° to 121°C. After recrystallization from hexane with the aid of active carbon the compound forms white needles melting at 124° to 125°C.

Analysis: $C_{14}H_{10}O_3NSCl$; (307.76)
calculated: C54.64; H 3.28; N 4.55; S 10.42; Cl 11.52%
found: 54.58; 3.40; 4.50; 10.14; 11.27%.

E. A mixture of 10 g of the compound of the Formula (25), 50 ml of ethanol and 20.8 ml of an ethylamine solution of 71.6 percent is refluxed for 2 hours. At room temperature, water is stirred into the reaction mixture until crystals settled out. Yield: 10g of the compound of the formula

(10) 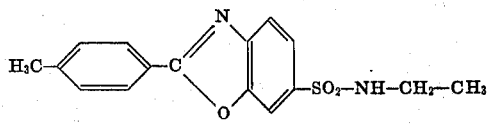

in the form of colorless needles melting at 162° to 163°C.

Analysis: $C_{16}H_{16}N_2O_3S$; (316.37)
calculated: C 60.74; M 5.10, N 8.86; S 10.14%
found: 60.60; 4.96; 8.69; 10.13%.

In an analogous manner the compound of the Formula (25) and methylamine furnish the compound of the formula

(11) 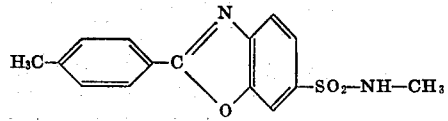

in the form of white needles from aqueous ethanol, melting at 185.5° to 186°C.

Analysis: $C_{15}H_{14}O_3N_2S$; (302.34)
calculated: C 59.59; M 4.67; N 9.27%.
found: 59.85; 4.53; 9.22%.

An analogous reaction of the compound of the Formula (25) and ammonia gives rise to the compound of the formula

(12) 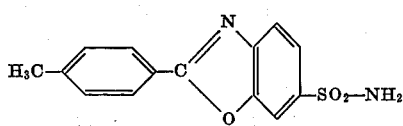

in the form of white needles from aqueous dioxane, melting at 244° to 245°C.

Analysis: $C_{14}H_{12}N_2O_3S$; (288.32)
calculated: C 58.32; H 4.20; N 9.72; S 11.12%
found: 58.51; 4.43; 9.86; 10.80%.

An analogous reaction of the compound of the Formula (31) and ethanolamine furnishes the compound of the formula

(13) 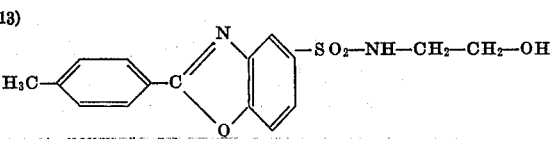

in the form of white needles from aqueous methanol, melting at 161° to 162°C.

Analysis: $C_{16}H_{16}N_2O_4S$; (332.37)
calculated: C 57.82; H 4.85; S 9.65%
found: 58.07; 5.15; 9.52%.

An analogous reaction of the compound of the Formula (31) and octylamine furnishes the compound of the formula

(14) 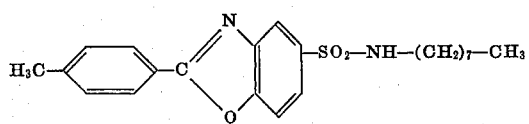

in the form of white needles from methanol, melting at 95° to 96°C.

Analysis: $C_{22}H_{28}O_3N_2S$; (400.52)
calculated: C 65.97; H 7.05; N 6.99; S 8.00%
E. Twelve 66.19; 6.94; 7.16; 7.96%. 15°half twelve parts of the compound of the formula

(29) 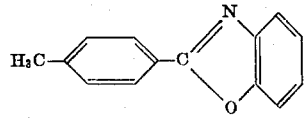

are dissolved in 23 parts by volume of concentrated sulphuric acid at 70° C with stirring. The reaction mixture is cooled to 0° C and 40 parts of oleum of 25 percent strength are added dropwise in the course of 40 minutes at 0° to 15°C. The reaction mixture is stirred at 18° to 18° C for another 3 hours and then poured into a solution of 40 parts of ammonium chloride in 130 parts of water, previously cooled to −10° C. The resulting suspension is stirred overmight at 40° to 50° C, filtered and washed with concentrated ammonium chloride solution until the filtrate shows neutral reaction. The residue is taken up in 40 parts of water, the suspension stirred for hald an hour, filtered with suction and dried in vacuo at 50° C. Approx. 15 parts of the ammonium salt of the formula (32)

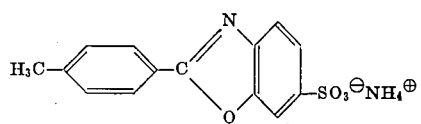

$-SO_3^{\ominus}NH_4^{\oplus}$ are obtained which, after recrystallization from water in the presence of active carbon and Fuller's earth, form a white crystalline substance melting above 360° C.

F. Ten parts of the ammonium salt of Formula (32) an suspended in 100 parts of n-butanol, 10 parts of triethanolamine are added and the reaction mixture is refluxed under a nitrogen atmosphere until no further ammonia escapes and the solution becomes clear. The solution is then concentrated by evaporation of 60 parts and allowed to crystallise overnight. The crystalline substance is filtered with suction, washed with 10 parts by volumne of n-butanol and then with 10 parts of absolute ethanol and dried in vacuo at 80° C. About 14 parts of the triethanolamine salt of the formula (33)

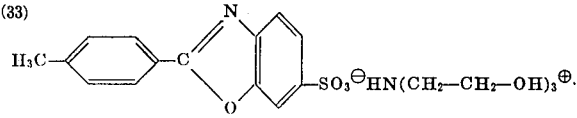

$-SO_3^{\ominus}HN(CH_2-CH_2-OH)_3^{\oplus}.$ are obtained in the form of white crystals (melting point: 145° to 146° C). After recrystallization from alcohol with addition of active carbon and Fuller's earth the melting point does not change. In dimethyl formamide the compound of Formula (33) shows absorption maxima at 302, 309, and 324 nm and in water at 298 and 306 nm.

EXAMPLE 1

(Cosmetic Formula)

| | |
|---|---|
| Cetiol (a mixture of esters of unsaturated fatty acids consisting predominantly of oleyloleate, prepared from spermaceti) | 10.00% |
| stearin | 6.00% |
| water | 89.95%. |
| KOH | 0.45% |
| triethanolamine | 1.10% |
| compound of the formula (8) | 2.50% |

The sunburn cream formulated in this manner very strongly absorbs harmful rays that produce sunburn but readily passes tanning rays.

TABLE 2

| | |
|---|---|
| Propyleneglycol | 5.00% |
| water | 67.50% |
| rectified alcohol | 25.00% |
| compound of the formula (9) | 2.5% |

The sunburn lotion prepared in this manner has an effect similar to that mentioned in Example 1.

EXAMPLE 3

Four parts of the compound of the Formula (10) are dissolved in 90 parts of ethanol and six parts of propyleneglycol, and 0.5 part of perfume oil is added. Forty parts of the solution thus obtained are charged into an aerosol container together with 60 parts of a mixture of equal proportions of trichloromonofluoromethane and dichlorofluoromethane. The aerosol spray thus obtained may be used as a sunburn preparation.

Instead of the compound (10) any one of the compounds of the formulas (11) to (14) may be used with a corresponding result.

EXAMPLE 4

Ten parts of adipic acid-isopropyl-tetrahydrofurfuryl ester, five parts of benzoic acid diethylamide, eight parts of phthalic acid dimethyl ester and five parts of the compound of the Formula (10) or (11) are dissolved in 36 parts of groundnut oil and 36 parts of liquid paraffin, to form a sunburn preparation which repels insects.

EXAMPLE 5

Four parts of the compound of the Formula (11) or (14), 10 parts of glycerin monostearate, four parts of cetyl alcohol, one part of sodium cetylsulphate, one part of stearic acid and five parts of glycerin are intimately mixed and emulsified in 75 parts of water.

The resulting emulsion lends itself very well to being used as a non-fatty skin cream which protects the treated skin areas from sunburn.

EXAMPLE 6

With the triethanolamine salt of Formula (33) cosmetic preparations are made as follows 1. Cream A.
- 4 parts of paraffine oil
- 6 parts of a mixture of isopropyl myristate and stearate
- 4 parts of hexyl-laurate
- 2 parts of cetostearyl alcohol
- 3 parts of stearic acid
- 3 parts of sorbitanemonostearate polyglycolether
- 3 parts of sorbitane monostearate B.
- 2 parts of compound of formula (33)
- 5 parts of sorbitol solution of 70 % strength
- 0.25 parts of mixture of parahydroxybenzoic methyl and propylester
- 68 parts of water The triethanolamine salt is dissolved in the aqueous medium and the solution heated to 70° C. Composition A is heated to the same temperature, A and B are mixed and the mixture is cooled to room temperature.

2. Skin Milk

A.
- 10 parts of a mixture of isopropyl myristate and palmitate 2 parts of hexadecylalcohol
5 parts of hexyllaurate
1 part of cetostearylic alcohol
1 part of stearic acid
4 parts of sorbitane monostearate polyglycolether
3 parts of sorbitane monostearate B.
3 parts of compound of formula (33)
5 parts of sorbitol solution of 70 % strength
0.25 part of mixture of of para-hydroxybenzoic methyl and propylester
67 parts of water The skin milk is prepared as described for the cream.

3. Solution
5 parts of compound of formula (33)
40 parts of ethanol
5 parts of sorbitol solution of 70 % strength in
50 parts of water The compound of Formula (33) is dissolved in the mixture of ethanol, sorbitol and water.

The cream, the skin-milk and the solution protect human skin areas from sunburn but do not prevent the tanning effect of the sun irradiation.

We claim:

1. A cosmetic preparation for protecting the skin from ultraviolet rays which contains as an ultraviolet ray absorber in a cosmetically acceptable carrier, from about 0.05 to 50 percent by weight of a 2-phenyl-benzoxazole compound having the formula

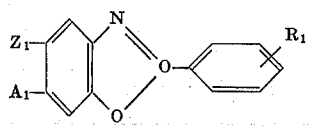

where $R_1$ represents a member selected from the group consisting of hydrogen and alkyl of one to six carbons, one of $A_1$ and $Z_1$ is a member selected from the group consisting of —$SO_3H$, —$SO_3^-Me^+$ and —$SO_2NHX_1$ $Me^+$ being selected from the group consisting of an alkali metal ion, ammonium ion, a lower dialkyl amine salt ion, triethanolamine salt ion and ethanolamine salt ion, and $X_1$ represents a member selected from the group consisting of hydrogen, alkyl of one to 12 carbons and hydroxyalkyl of one to four carbons, with the proviso that when $A_1$ represents one of the aforesaid sulfonic groups, $Z_1$ stands for a member selected from the group consisting of hydrogen and alkyl of one to four carbons, and that when $Z_1$ represents one of the afore-mentioned sulfonic groups, $A_1$ stands for hydrogen.

2. A cosmetic preparation according to claim 1, wherein the 2-phenylbenzoxazole compound contains at least one alkyl of 1 to 4 carbons.

3. A cosmetic preparation according to claim 1, wherein the 2-phenylbenzoxazole compound has the formula

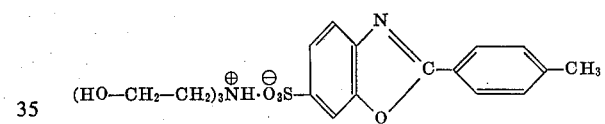

where $R_2$ represents a member selected from the group consisting of methyl and tertiary butyl and $A_2$ stands for —$SO_3^-Me^+$ or —$SO_2NHX_2$, where $Me^+$ is selected from the group consisting of an alkali metal ion, an ammonium ion and a triethanolamine salt ion, and $X_2$ represents alkyl of one to eight carbons.

4. A cosmetic preparation according to claim 1, wherein the 2-phenyloxazole compound is the triethanolamine salt of the 2-(4'-methylphenyl)-benzoxazole-6-sulfonic acid of the formula 5. A process for protecting the skin from ultraviolet rays which comprises applying thereto the preparation defined in claim 1.

6. A process for protecting the skin from ultraviolet rays which comprises applying thereto the preparation defined in claim 3.

7. A process for protecting the skin from ultraviolet rays which comprises applying thereto the preparation defined in claim 4.

* * * * *

UNITED STATES PATENT OFFICE
CERTIFICATE OF CORRECTION

Patent No. 3,696,193          Dated October 3, 1972

Inventor(s) LEONARDO GUGLIELMETTI ET AL

It is certified that error appears in the above-identified patent and that said Letters Patent are hereby corrected as shown below:

Column 13, line 29, delete "50" and substitute --- 5 ---; the center portion of the formula should read ---

;

line 42, before the last group delete "13" and insert -- — --.

Signed and sealed this 25th day of June 1974.

(SEAL)
Attest:

EDWARD M. FLETCHER, JR.
Attesting Officer

C. MARSHALL DANN
Commissioner of Patents